United States Patent
Trezza et al.

[11] Patent Number: 5,909,303
[45] Date of Patent: Jun. 1, 1999

[54] OPTICAL MODULATOR AND OPTICAL MODULATOR ARRAY

[75] Inventors: John A. Trezza, Nashua, N.H.; Martin Morf; James S. Harris, both of Stanford, Calif.

[73] Assignee: The Board of Trustees of the Leland Stanford Junior University, Stanford, Calif.

[21] Appl. No.: 08/778,817

[22] Filed: Jan. 3, 1997

Related U.S. Application Data

[60] Provisional application No. 60/009,598, Jan. 4, 1996.
[51] Int. Cl.$^6$ .............................. G02F 1/03; G02F 1/015
[52] U.S. Cl. .......................... 359/248; 359/245; 359/247; 359/260; 359/322
[58] Field of Search ............................ 356/352; 359/245, 359/246, 247, 248, 260, 322; 349/16, 115, 198

[56] References Cited

U.S. PATENT DOCUMENTS

| | | | |
|---|---|---|---|
| 4,400,058 | 8/1983 | Durand et al. | 356/352 |
| 5,037,169 | 8/1991 | Chun | 385/16 |
| 5,068,749 | 11/1991 | Patel | 356/352 |
| 5,076,699 | 12/1991 | Ryan et al. | 356/352 |
| 5,408,319 | 4/1995 | Halbout et al. | 356/352 |
| 5,414,726 | 5/1995 | Raj et al. | 372/26 |
| 5,424,559 | 6/1995 | Kasahara | 257/21 |
| 5,452,121 | 9/1995 | Hilgeman | 356/352 |
| 5,452,127 | 9/1995 | Wagner | 356/352 |
| 5,592,314 | 1/1997 | Ogasawara et al. | 356/352 |

*Primary Examiner*—Georgia Epps
*Assistant Examiner*—Margaret Burke
*Attorney, Agent, or Firm*—Lumen Intellectual Property Services

[57] ABSTRACT

A reversible and conservative photon routing switch is implemented as a room temperature, optical, vertical cavity X-gate (also sometimes known as a Fredkin gate). Such gates are primitive structures into which all logic functions can be decomposed. The construction of the device makes it uniquely suited to dense packed arrays of optoelectronic components for optical routing and logic. In one of the switching states, light incident on the device from either side of the wafer will pass through the device (the device is bi-directionally transmissive). In the other switching state, light incident from either side of the wafer will be reflected. Switching can be performed using either electrical or optical control. Thus incident photons are either routed through the device or reflected from the device. The characteristics of the device operation for both transmission and reflection are designed to be nearly identical regardless of whether the incident light impinges upon the top of the device or the bottom of the device (after passing through the substrate). This ability to have input light from either side makes the device reversible. This dual reversible and conservative nature along with the vertical cavity format allows for dense two dimensional arrays of devices to be formed on a single substrate. Furthermore, because the incident photon stream is recoverable in both the on and off states and can be recovered from either the top or the bottom of the wafer, device layers can be vertically stacked. Thus the device is useful for 3-D device geometry in which optical outputs from one set of devices can be directly used as the inputs to other sets of devices.

44 Claims, 14 Drawing Sheets

Transmissive (Off) State

Reflective (On) State 4-bit Table Output

OPTICAL MODULATOR AND OPTICAL MODULATOR ARRAY

This patent application is based upon provisional U.S. patent application No. 60/009,598 filed Jan. 4, 1996 which is incorporated herein by reference.

FIELD OF THE INVENTION

This invention relates generally to systems for switching or modulating optical signals. More particularly, it relates to optoelectronic modulators and optical networks comprising such modulators.

BACKGROUND OF THE INVENTION

The quantum-confined Stark effect (QCSE) has been extensively investigated for its use as an optical intensity modulator. The lowest-energy absorption edge of a semiconductor is a multiparticle system comprised of extended electron and hole states which are correlated through the Coulomb interaction. These states, known as Wannier excitons in semiconductors, have two properties which make them a noteworthy choice for intensity modulation. First, the absorption of these excitons can be quite large (around $3 \times 10^4$ cm$^{-1}$ under zero electric bias when the excitons are confined in a single dimension by a quantum well) and, second, the absorption peak can be shifted by applying an electric field across the active region. Thus, a wavelength region which had little or no absorption can be made to have quite high absorptive properties with an applied voltage. The ability to create intensity modulators follows directly. Quantum-well optical intensity modulators have been made in waveguides, in vertical reflection modulators, in vertical transmission modulators, and in vertical Fabry-Perot modulator configurations.

Among them, the asymmetric Fabry-Perot modulator (AFPM) has been proposed as one of the most promising devices for free-space optical interconnect. The free-space optical interconnects offer several advantages over traditional two-dimensional electronic circuits: complete connectivity, freedom from crosstalk, inherent impedance matching, high "pinout" density, and a lower ratio of drive power to data rate for relatively long connections. The AFPM architecture is well-suited to the optical interconnects for its surface-normal configuration, polarization independence, low insertion loss, low chirp, high contrast between on and off states, and VLSI-compatible drive voltage.

The types of modulators with the AFPM structure discussed in the previous works include reflection (reflective/absorptive) modulators and transmission (transmissive/absorptive) modulators. Five prior publications on the reflection modulators are shown below.

Pezeshki et al., "Optimization of modulation ratio and insertion loss in reflective electroabsorption modulators," (Appl. Phys. Lett., Vol. 57, No. 15, October 1990) shows theoretically that the maximum modulation ratio in Fabry-Perot reflective electroabsorption modulators for a given insertion loss is solely a function of the ratio of the maximum to minimum absorption.

Goossen et al., "Monolithic integration of normally-on and normally-off asymmetric Fabry-Perot modulators by selective anti-reflection coating," (SPIE Photonic Switching, Vol. 1807, 1992) integrates normally-on and normally-off high-contrast reflection modulators by selective AR coating.

Trezza et al., "High contrast asymmetric Fabry-Perot electroabsorption modulator with zero phase change," (Appl. Phys. Lett., Vol. 63, No. 4, July 1993) determines the wavelengths and biases at which there exist large absorption changes and zero refractive index changes relative to zero bias. At these wavelengths and biases, zero-chirp reflection modulators can be realized.

Trezza et al., "Zero chirp quantum well asymmetric Fabry-Perot reflection modulators operating beyond the matching condition," (J. Appl. Phys., Vol. 74, No. 12, December 1993) demonstrates asymmetric Fabry-Perot reflection modulators which operate beyond the matching condition and exhibit zero phase change (zero chirp) when switched.

The two prior publications on the transmission modulators are listed below.

Trezza et al., "Low-voltage, low-chirp, absorptively bistable transmission modulators using type-IIA and type-IIB In$_{0.3}$Ga$_{0.7}$As/Al$_{0.33}$Ga$_{0.67}$As/In$_{0.15}$Ga$_{0.85}$As asymmetric coupled quantum wells," (J. Appl. Phys., Vol. 74, No. 11, December 1993) theoretically analyzes and experimentally demonstrates the modulation of the optical transmission.

Lin et al., "Normally on GaAs/AlAs multiple-quantum well Fabry-Perot transmission modulator with ON/OFF contrast ratio >7.4," (Appl. Phys. Lett., Vol. 66, No. 10, March 1995) reports a normal-incident normally on GaAs/AlAs multiple-quantum well Fabry-Perot transmission modulator.

A significant disadvantage of the prior art is that for both reflection modulators and transmission modulators, the incident photon energy is unrecoverable in one of the two switching states. In addition, the existing reflection modulators operate only with light impinging from one side of the wafer. Therefore, they can not be used as X-gates in which all logic functions can be decomposed. In the past, X-gates were realized using many CMOS gates or quantum electronics at millikelvin temperatures, both of which are incompatible for practical, efficient switching architectures. Optically, X-gates were made using meters of optical fibers which are clearly not compatible with dense packed device arrays.

OBJECTS AND ADVANTAGES OF THE INVENTION

Accordingly, it is a primary object of the present invention to provide a transmissive/reflective device for modulating optical signals. It is a further object of the invention to provide such a device which is reversible and bi-directional. It is an additional object of the invention to provide a dense modulator array comprising a plurality of reversible and bi-directional transmissive/reflective optical modulators.

SUMMARY OF THE INVENTION

These objects and advantages are attained by fabricating a transmissive/reflective device for modulating optical signals. The device is a slightly asymmetric Fabry-Perot cavity which comprises a first mirror having a reflectivity $R_1$, a second mirror having a reflectivity $R_2$ and positioned parallel to and at a distance L from the first mirror, and an active region interposed between the first mirror and the second mirror. The active region comprises quantum wells, and has a variable optical absorption coefficient $\alpha$. $R_1$ is nearly equal to $R_2 e^{-\alpha L}$. The device is switched between a first state and a second state by a control electrical or optical signal which changes the complex valued optical absorption coefficient of the active region from a first value $\alpha_1$ to a second value $\alpha_2$. The ratio of $\alpha_2$ to $\alpha_1$ is far from 1 and one or both of $\alpha_1$ and $\alpha_2$ are close to zero. In the first state, the incident optical signals are mostly transmitted through the device, and in the second state, mostly reflected from the device. Reflection or transmission versus bias characteristics for signals incident on the first mirror are close to those for signals incident on the second mirror. Therefore, the device is reversible and bi-directional. An intensity of optical signal transmitted through the device in the first state is substantially equal to that reflected in the second state. The index of refraction of the active region in the first state is nearly equal to that in the second state, whereby the device has zero chirp.

There exist two configurations to implement the transmissive/reflective devices. A waveguide architecture typically requires the first and second mirrors to be DBR mirrors, and a vertical cavity architecture can have the first and second mirrors be quarterwave stacks. If voltage is applied across the active region by reverse biasing a p-i-n diode, the first and second mirrors are p-type and n-type doped, respectively. Both mirrors are made of GaAs/AlAs. At least one of them can comprise a dielectric material which includes $SiO_2$, $ZrO_2$, $TiO_2$, $YO_3$, and others; at least one of the two mirrors can comprise a metal. The active region of the device comprises a material chosen from the group consisting of a plasma, an organic polymer, a lithium niobate crystal, a photo-refractive crystal, an electro-optic crystal, a liquid crystal material, and a semiconductor material comprising a III–V semiconductor using In, Ga, or Al as the group III semiconductor and either As, N, Sb, or P as the group V element, or a semiconductor material consisting of silicon or silicon germanium material systems. When the control signal is optical, the material of the active region must have a large effective third order nonlinear coefficient. The substrate on which the vertical cavity devices are grown comprises a material chosen from the group consisting of a glass, sapphire, and a semiconductor crystal. The semiconductor crystal is one of GaAs, SiN, SiC, GaN, and InP of which GaAs, GaN, InP can also contain Al and In. The devices can further have a gain region capable of amplifying the optical signals.

In addition to the transmissive/reflective device, a bi-directional and reversible device is also fabricated. The device is a slightly asymmetric Fabry-Perot cavity which comprises a first mirror having a reflectivity $R_1$, a second mirror having a reflectivity $R_2$ and positioned parallel to and at a distance L from the first mirror, and an active region interposed between the first mirror and the second mirror. The active region comprises quantum wells, and has a variable optical absorption coefficient. The device is switched between a first state and a second state by a control electrical or optical signal which changes the complex valued optical absorption coefficient of the active region between a first value $\alpha_1$ and a second value $\alpha_2$. In each of the two states, the device affects the optical signals incident on the first mirror in substantially the same way as it affects the optical signals incident on the second mirror; in other words, the device is bi-directional and reversible. For the transmissive/reflective device, in the first state, the incident optical signals are mostly transmitted through the device, and in the second state, mostly reflected from the device. For the transmissive/absorptive device, in the first state, the incident optical signals are mostly transmitted through the device, and in the second state, mostly absorbed within the device. For the reflective/absorptive device, in the first state, the incident optical signals are mostly reflected from the device, and in the second state, mostly absorbed within the device. If the index of refraction of the active region in the first state is made to be nearly equal to that in the second state, the device is zero chirp. Conversely, if the index of refraction is made to be different in the second state from that in the first state, then switching can occur by shifting the Fabry-Perot resonant wavelength in addition to (or instead of) changing the absorption in the cavity.

There exist two configurations to implement the bi-directional and reversible devices. A waveguide architecture can have the first and second mirrors to be DBR mirrors; a vertical cavity architecture can have the first and second mirrors to be quarterwave stacks. For both configurations, if bias is applied across the active region through a p-i-n structure, the first and second mirrors are p-type and n-type doped, respectively. Both mirrors are made of GaAs/AlAs. At least one of the two mirrors can comprises a dielectric material which include $SiO_2$, $ZrO_2$, $TiO_2$, $YO_3$, and others; at least one of the two mirrors can comprises a metal. The active region of the device comprises a material chosen from the group consisting of a plasma, an organic polymer, a lithium niobate crystal, a photo-refractive crystal, an electro-optic crystal, a liquid crystal material, and a semiconductor material comprising one of GaSb, GaP, GaAs, SiN, SiC, GaN, and InP of which GaAs, GaN, InP, GaSb, GaP can also contain Al and In. When the control signal is optical, the material of the active region must have a large effective third order nonlinear coefficient. The substrate on which the vertical cavity devices are grown comprises a material chosen from the group consisting of a glass, sapphire, and a semiconductor crystal. The semiconductor crystal is one of GaAs, SiN, SiC, GaN, and InP of which GaAs, GaN, InP can also contain Al and In. The devices can further have a gain region capable of amplifying the incident optical signals.

The transmissive/reflective bi-directional and reversible asymmetric Fabry-Perot cavity modulators can be used to form an optical modulator array. The devices can be arranged in a plane or stacked in a three-dimensional array. A subset of the array can implement a full-adder circuit.

BRIEF DESCRIPTION OF THE DRAWINGS

FIGS. 14A, 14B, 14C, 14D, 14E, and 14F are schematic diagrams of a Full-Adder/3-2 counter created with four X-gates.

DETAILED DESCRIPTION

Figure 1:
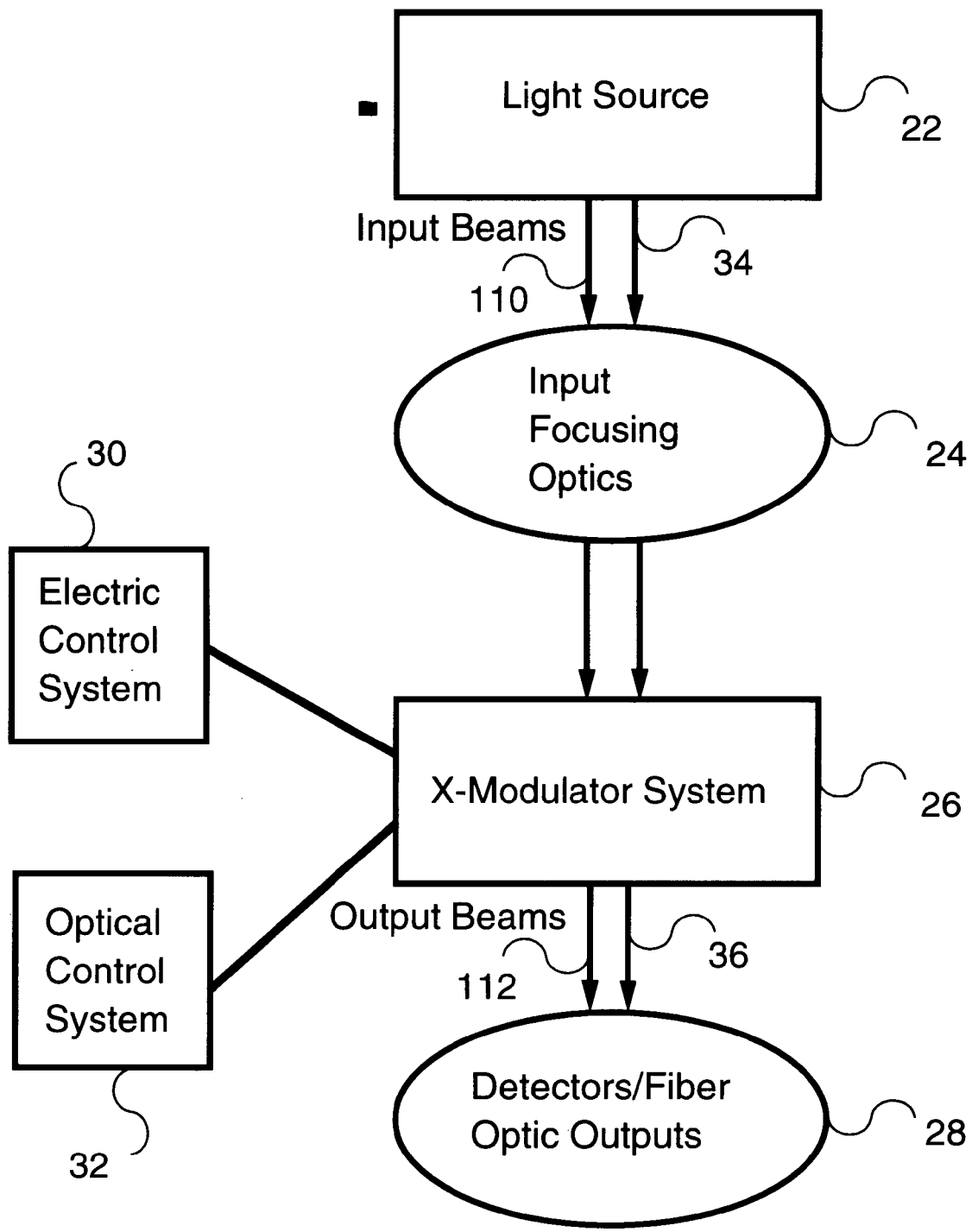
FIG. 1 is a general block diagram for a system using an implementation of the invention.

A block diagram for a system with an implementation of the invention is illustrated in FIG. 1. A light source 22 generates a light beam 34 which is focused through bulk or fiber optics 24 onto an X-modulator system 26. The X-modulator system 26 modifies the input beam 34 with or without external mirrors altering the beam direction. The output beam 36 collected by additional optics travels to a detector or fiber optic output 28. The properties of the X-modulator system 26 can be controlled either electrically or optically. For the former, the control electronics 30 can be integrated or flip-chip bonded onto the X-modulator wafer or packaged separately. In the latter case, the control 32 can be achieved through the use of SEED or integrated detectors, the bleaching of excitons, or the stimulation of intraband transitions in doped quantum wells.

Figure 2:
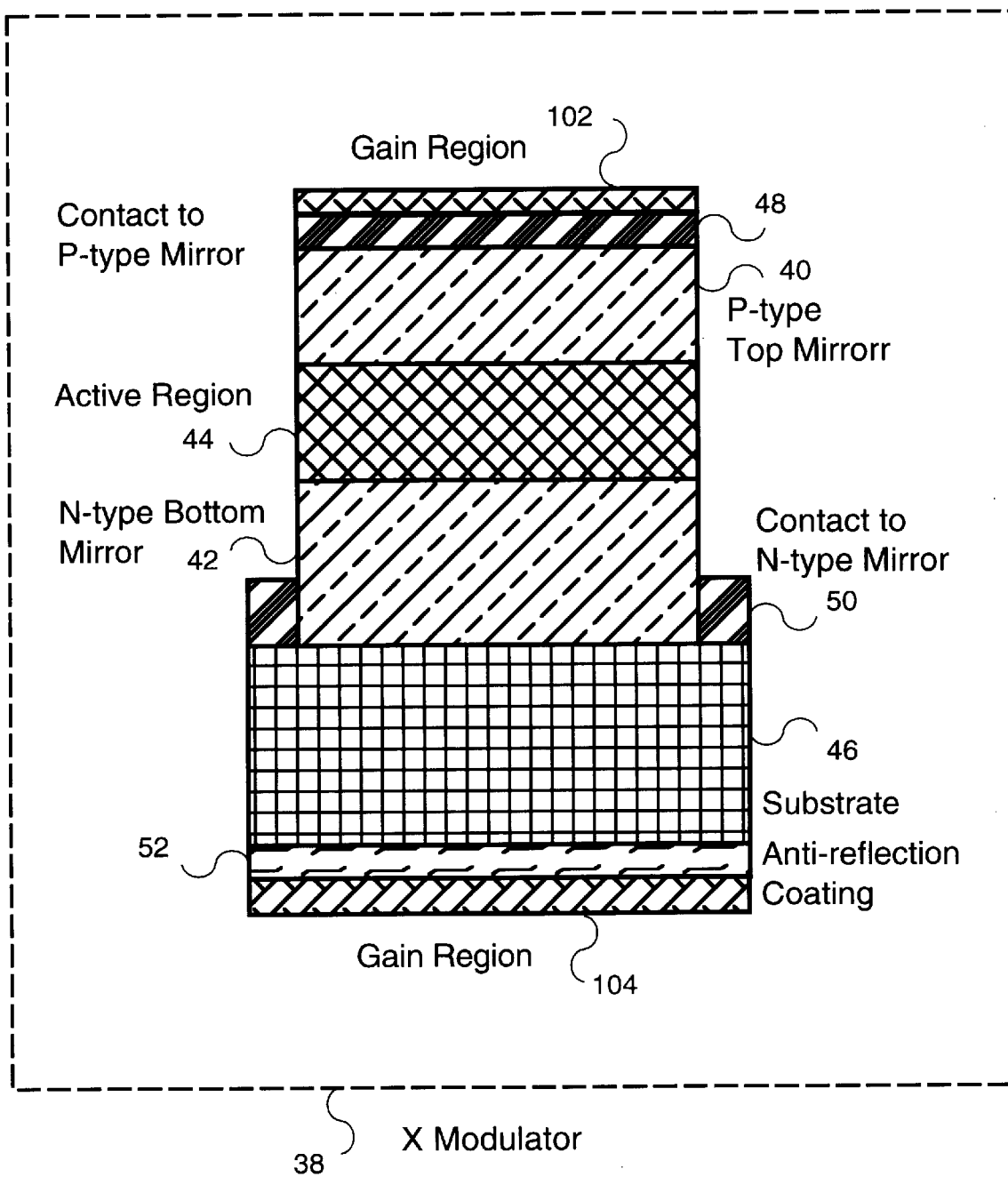
FIG. 2 is a schematic diagram of an individual device element.

The structure of an exemplary X-modulator is shown in FIG. 2. The modulator 38 comprises a Fabry-Perot cavity containing top and bottom mirrors 40 and 42 surrounding an active region 44. The mirrors 40 and 42 are composed of quarter wave GaAs/AlAs mirror stacks. Depending upon the operating wavelength of the device, at least one of the front and bottom mirrors can comprise a dielectric material such as $SiO_2$, $ZrO_2$, $TiO_2$, $YO_3$, or others, and at least one of the two mirrors can comprise a metal. The active region 44 comprises quantum wells composed of a semiconductor material comprising a III–V semiconductor using In, Ga, or Al as the group III semiconductor and either As, N, Sb, or P as the group V element, or a semiconductor material consisting of silicon or silicon germanium material systems. In general, the active region can be made of a semiconductor as well as a plasma, an organic polymer, a lithium niobate crystal, a photo-refractive crystal, a liquid crystal, and an electro-optic crystal. When the control signal is optical, the material of the active region must have a large effective third order nonlinear coefficient. The X-modulator 38 with the InGaAs/GaAs quantum wells has an operating wavelength around 1 $\mu$m. The operating wavelength of an X-modulator may be extended down to 0.35 $\mu$m by utilizing GaN/AlN quantum wells or up to 2 $\mu$m by using InAs or InSb quantum wells. The wavelengths at which the quantum wells are absorptively active must be longer than the wavelength corresponding to the substrate bandgap unless the substrate is removed by etching or epitaxial liftoff. The substrate 46 of the device 38 is made of SiN though in general the substrate can be made of a glass, sapphire, a semiconductor crystal, or others. The semiconductor crystal can be chosen from a group consisting of SiN, SiC, GaAs, GaN and InP of which GaAs, GaN, and InP can contain one or both of Al and In. Although the substrate in the fully processed device merely provides a structural support, it must be compatible with the growth of the quantum wells during the fabrication process. The metal contacts 48 and 50 of the device 38 are placed at the top and bottom of the structure, and the top and bottom mirrors 40 and 42 are doped to p-type and n-type respectively. By applying a voltage across the two metal contacts 48 and 50, the change of the electric field inside the quantum wells 44 modulates the complex valued optical absorption coefficient. The bottom of the substrate 46 is coated with an anti-reflecting layer 52 to eliminate any parasitic effects due to the optical reflection from the substrate-air interface. If the substrate is removed by etching or liftoff, this anti-reflection layer step may not be required. Furthermore, the device 38 can comprise two gain regions 102 and 104 to amplify incident optical signals.

The front mirror 40 has the reflectivity $r_f$ and the back mirror 42 has the effective reflectivity $r_b e^{-\alpha L}$, where $\alpha$ is the complex valued optical absorption coefficient of the quantum wells 44 and L is the cavity thickness. At zero electric bias, the quantum wells 44 are designed to be absorptive in the range of wavelengths shorter than the resonant wavelength of the cavity, so that $\alpha$ is very close to zero at the resonant wavelength. If $r_f$ and $r_b$ are equal, the reflectivity of the front mirror 40 approximately equals the effective reflectivity of the bottom mirror 42. [This gives rise to destructive interference inside the cavity; therefore, the cavity is transmissive]

Quantitatively, the reflectivity and transmissivity of the cavity can be calculated as follows.

$$R = \left( \frac{r_b e^{-\alpha L} - r_f}{1 - r_f r_b e^{-\alpha L}} \right)^2 \quad (1)$$

$$T = \frac{(1 - r_b^2)(1 - r_f^2)e^{-\alpha L}}{(1 - r_f r_b e^{-\alpha L})^2} \quad (2)$$

where R and T are the reflectivity and transmissivity of the cavity. If $r_f$ and $r_b$ are equal and the real valued part $\alpha$ is small, R approaches zero and T approaches unity as shown in Eqs. (1) and (2). The positions of the front and back mirrors 40 and 42 are interchangeable; in other words, the device 38 is reversible. If the device 38 is electrically controlled, the application of an electric field increases the absorption coefficient (the real valued part of $\alpha$) of the quantum wells 44 at the cavity resonant wavelength. The larger real valued part of $\alpha$ value decreases the transmissivity T and increases the reflectivity R. The cavity changes from being transmissive to being reflective. Alternatively, if the device is operated so that the bias only significantly changes the refractive index (imaginary valued part of $\alpha$) of the cavity, the Fabry-Perot wavelength can be shifted so that the transmission wavelength with bias is different from the transmissive wavelength without bias. In this case the device will operate qualitatively the same as if absorptive changes are used in the manner described above (switching from transmissive to reflective at the operating wavelength with bias).

Figure 3:
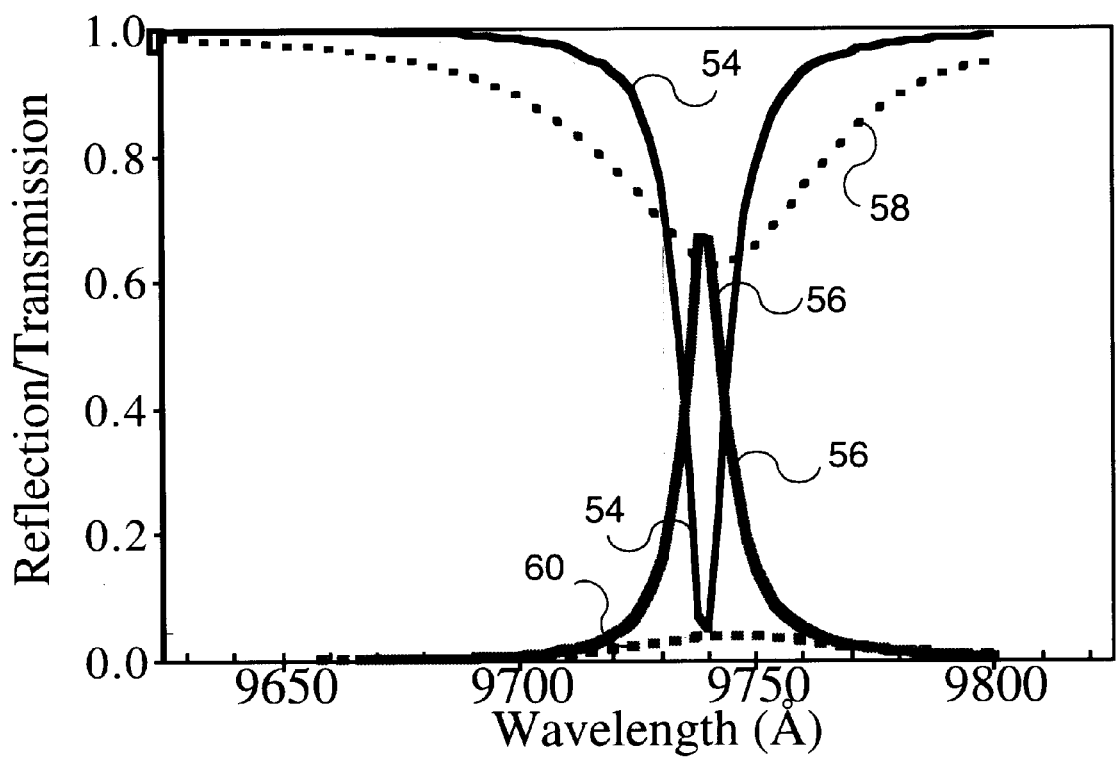
FIG. 3 is a graph of the reflectivity and transmissivity as functions of wavelength for an X-modulator.
Figure 4A:
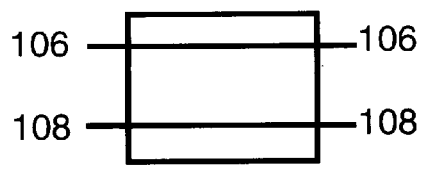
FIGS. 4A, 4B, 4C, and 4D depict an X-modulator as a 2×2 crossbar switch.
Figure 4B:
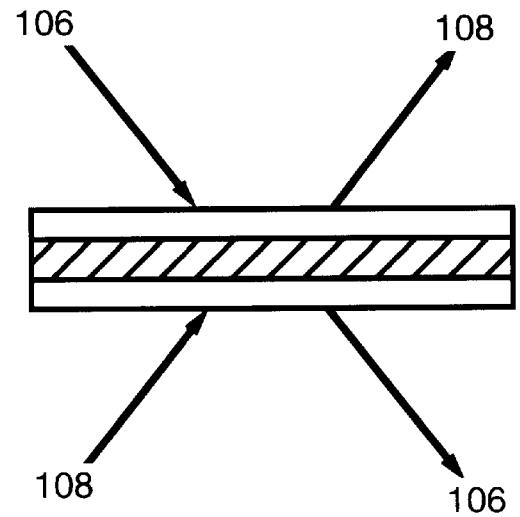
Figure 4C:
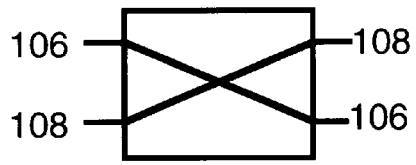
Figure 4D:
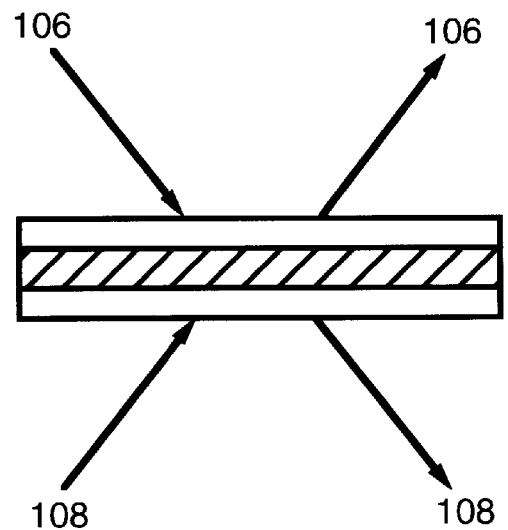

FIG. 3 illustrates the experimental reflectivity and transmissivity as functions of wavelength for the X-modulator 38 illuminated from the top mirror. The "on" state of the device corresponds to the reflective mode; the "off" state corresponds to the transmissive mode. When switched from "on" to "off" with an applied bias of 40 volts, the reflectivity changes from the curve 58 to the curve 54, and the transmission changes from the curve 60 to the curve 56. In other words, when switched, at the resonant wavelength, the transmissivity reduces from 60% to 6%; while the reflectivity increases from 6% to 60%. Although the light beam experiences some loss, given a 60% output efficiency, this 60% available output power is entirely transferred to one of the two directional outputs (reflected and transmitted outputs) with zero net amplitude modulation. Because an output signal is available in both the "on" and "off" states, the device is said to be operating in a conservative manner. In addition, when the device 38 is illuminated from the bottom mirror, its reflectivity and transmissivity values are within 1.5% of those using top incident light; the device is thus reversible. Photons can be incident simultaneously from the top and bottom of the wafer and both of these inputs can be switched at the same time with the same characteristics.

Through the proper use of quantum wells, the application of electric field can cause no changes in the index of refraction even though it changes the optical absorption coefficient. For a single quantum well, a specific voltage bias can be found to provide the same index of refraction as the zero-volt bias at a given wavelength; while for coupled quantum wells, a continuous bias range can be found to provide the same index of refraction as the zero-volt bias at a given wavelength. By operating the X-modulators at the wavelength and bias voltages at which the index of refraction remains constant, the device can switch back and forth between reflection and transmission modes with no changes in the phase of the output beam; i.e. the device has zero chirp.

In summary, a fully optimized device 38 in FIG. 2 can have up to four distinguishing characteristics. First, the device changes from transmissive to reflective under switching. Second, the optical characteristics, i.e. the dependence of reflectivity and transmissivity upon electrical bias, are nearly the same regardless of whether the input beam illuminates the top mirror or the bottom mirror. Third, the percentage of light transmitted in the transmissive mode is the same as the percentage of light reflected in the reflective mode. The intensity of the output beam thus remains constant under both modes. Fourth, the device can have zero chirp. All four characteristics are important though only the first two are required for the device to perform functionally as an X-modulator.

An X-modulator can be thought of as a single element 2×2 crossbar switch, as shown in FIG. 4A through FIG. 4D. One beam illuminates each side of the device to provide a total of two input beams. In the "off" state, two input beams 106 and 108 are allowed to propagate through the structure unaltered, and the device acts as a pass gate. In the "on" state, the incident beams are reflected and thus routed into the same directions that the other beam initially has. Thus the directions of the two incident beams 106 and 108 are 'crossed'. The X-modulator embodies a simple primitive unit into which all logic functions can be decomposed.

The creation of large X-modulator arrays to perform complex logical functions depends upon the ability of individual devices to operate at specific angles. For an X-modulator whose Fabry-Perot resonant wavelength at normal incidence is 9840Å, the contrast ratio between the "off" and "on" states degrades when the incident angle exceeds 21° because the cavity mode shifts with the incident angle but the exciton absorption wavelength does not. In order to operate at an angle larger than 21° which might be desirable for an array of interconnected devices, the devices with a wider cavity are needed. The wider cavity can offset the blue-shift in the cavity mode due to the input angle. It should be pointed out, however, that the lowest heavy hole exciton does not absorb TM polarized light which propagates along the plane of the quantum wells; thus, at the large incident angle, the observed absorptive characteristics for the TM light are different from that at normal incidence and this could affect device performance.

Figure 5:
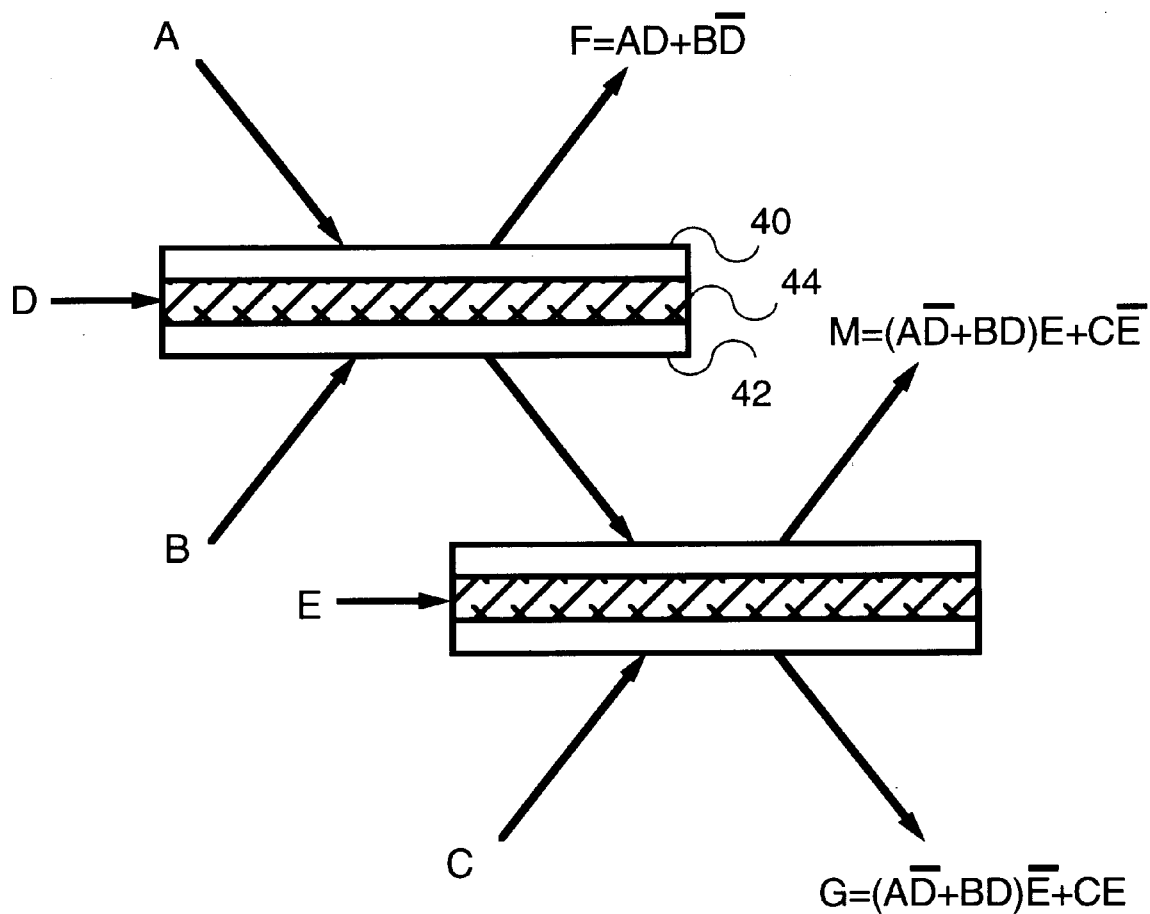
FIG. 5 is the theoretical outputs for two stacked square X-modulators.
Figure 6A:
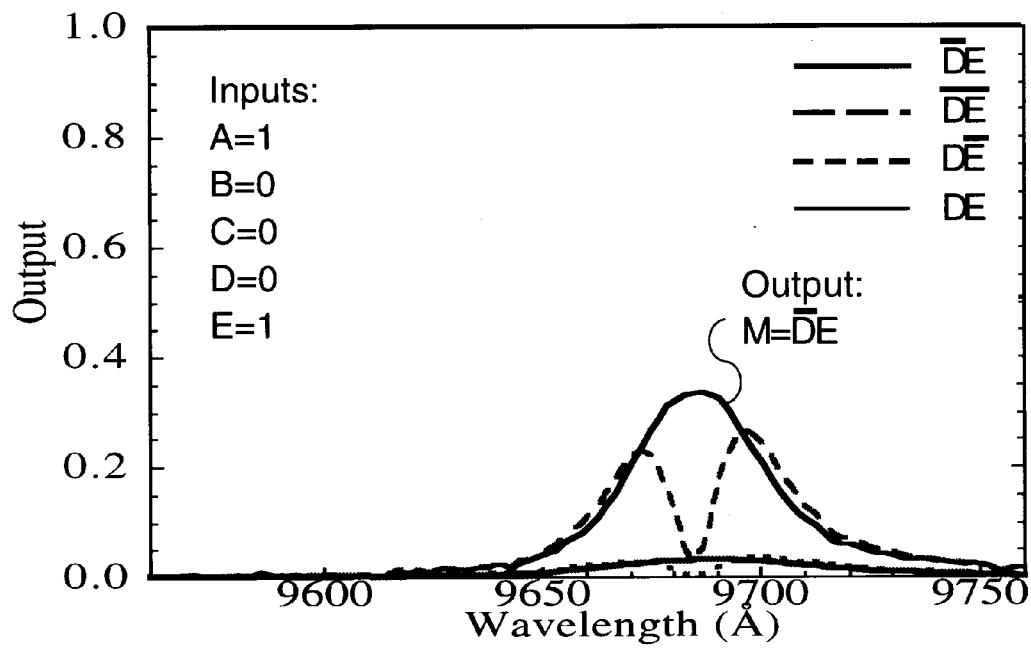
FIGS. 6A and 6B are the experimental outputs for two stacked square X-modulators.
Figure 6B:
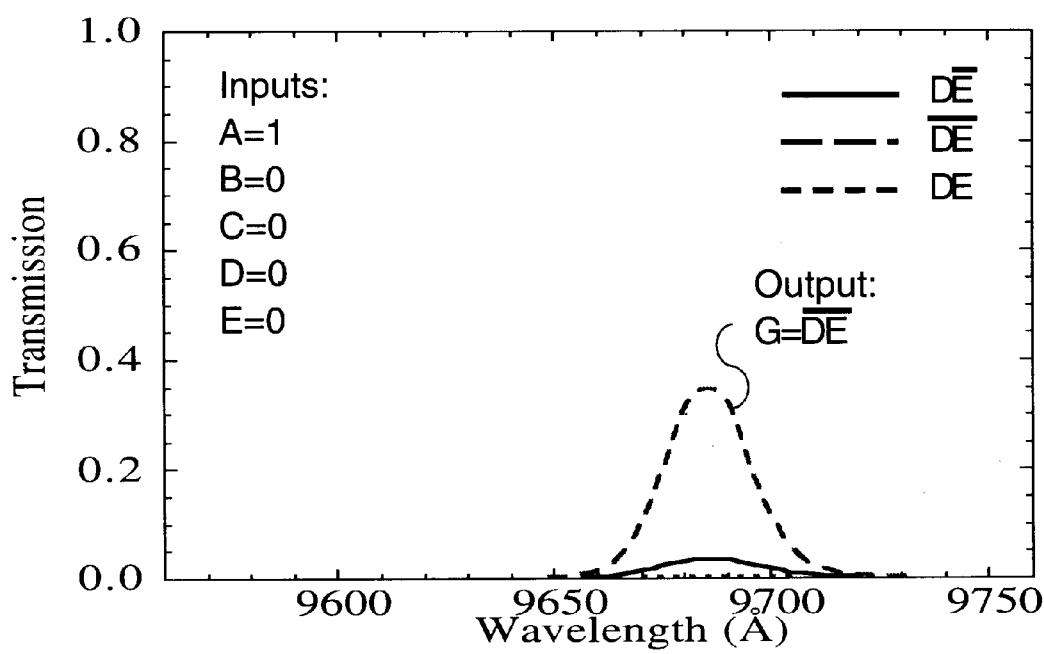

With an incident angle of 21°, the optical properties of two stacked 200 $\mu$m×200 $\mu$m square X-modulators were theoretically predicted and experimentally verified. FIG. 5 displays the beam routing capabilities and the logic functions achievable with such a configuration. The setup is capable of utilizing two electrical inputs D and E and three optical inputs A, B, and C, and producing three optical outputs F, M, and G. The 21° incident angle imparts a 50Å blue shift to the Fabry-Perot resonant wavelength. During the experimental measurements, only A was an "on" optical signal, so F, M and G are effectively equal to D, $\overline{D}$×E, and $\overline{D}$×$\overline{E}$ respectively. With D=0 and E=1, M is expected to be 1; with D=0 and E=0, G is expected to be 1. The experimental verifications are shown in FIG. 6. Because an input photon can be steered to one of the three outputs F, M, and G, a simple demultiplexing scheme has been performed.

Figure 7:
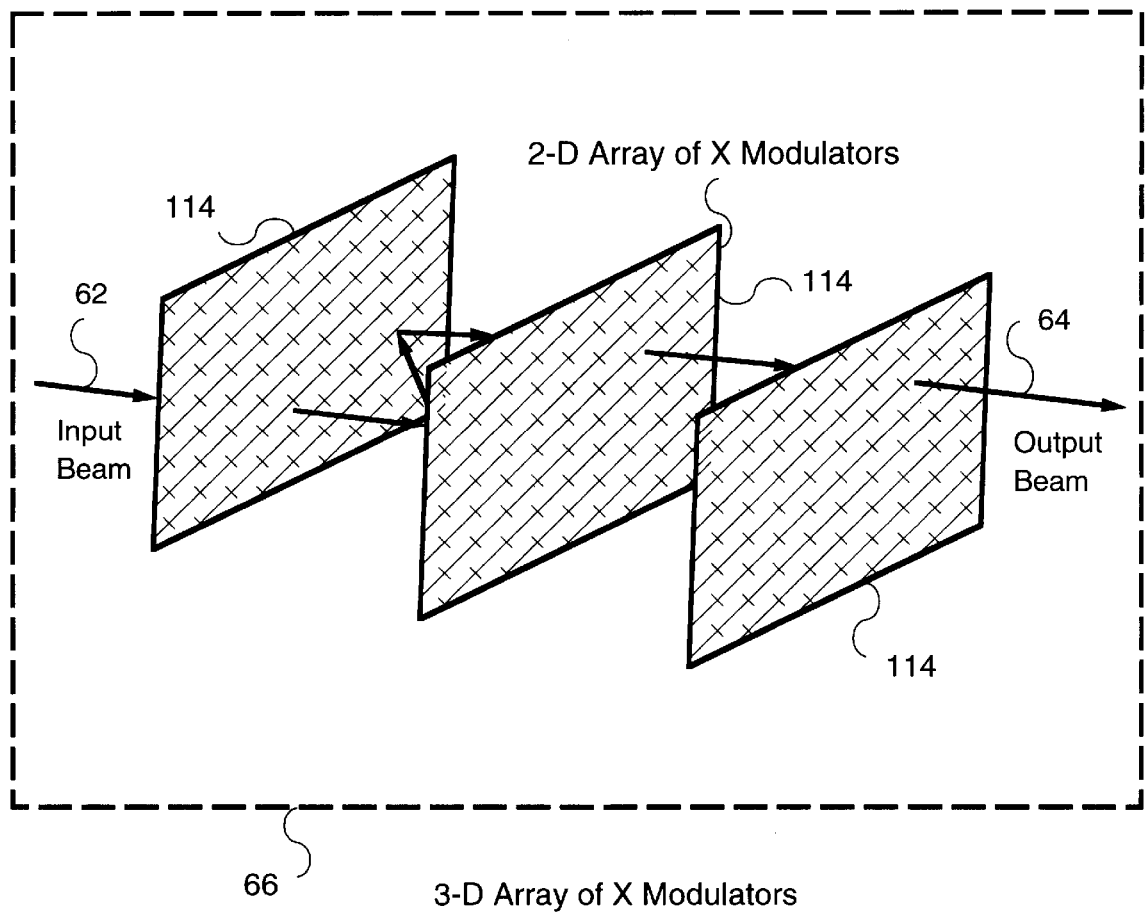
FIG. 7 is a schematic diagram for a 3-D X-modulator array.

3-D X-modulator arrays, composed of stacked wafers 114 each of which contains large 2-D arrays of vertical cavity devices can perform extremely efficient complex switching, routing, and logic functions, as shown in FIG. 7. Since each individual element can be either reflective or transmissive, an input beam 62 illuminating either side of the 3-D array 66 can pass through the devices or device planes multiple times. By appropriate choice of electrical inputs, the directions of optical inputs, device layout, and stacking method, the desired array functions could be "programmed."

The 2-D arrays forming the 3-D array 66 can be controlled in a number of ways. The first method is to utilize direct electrical connections. Each device has a direct pin out to the outside of a package, or an integrated multiplexor is placed on the X-modulator wafer or flip-chip bonded to the wafer. The second method is to utilize integrated receivers. The receivers accept an optical 'control' signal and has a Symmetric-Self Electro-Optic Effect Device (S-SEED) configuration or a detector/transistor configuration. In the S-SEED configuration, the X-modulators have an overall electrical bias across them. By impinging light upon the detectors, the photocurrent is generated and latches the voltage across the X-modulators. Alternatively, in the detector/transistor configuration, the photocurrent generated in the detectors activates the transistors which would switch a voltage onto the X-modulators. The detectors could be made nearly identical in structure as the X-modulators, with perhaps a small etch of the top mirror to increase detector efficiency.

The third method is to utilize the optical control directly onto the X-modulators in one of two ways. First, an electric field is applied across the devices at all times. When the control beam intensity is low, the devices are "on" with strong reflection. When the control beam intensity is high (greater than 10 kW/cm$^2$), high concentration of carriers are generated which electrically screen the quantum well excitons. Since the excitons are the primary element providing the optical changes responsible for the switching of the devices, the devices are effectively switched 'off' with strong transmission. The alternative method for direct optical control involves the use of doped quantum wells. With an electrical bias, the dopant carriers screen the quantum well excitons, and the devices are in the "off" state. The dopant carriers can be removed from the lowest energy levels by long wavelength light through intraband transitions. Since these energy levels are responsible for the lowest energy excitons, the excitons optical strength is enhanced and the devices are turned "on".

Figure 8:
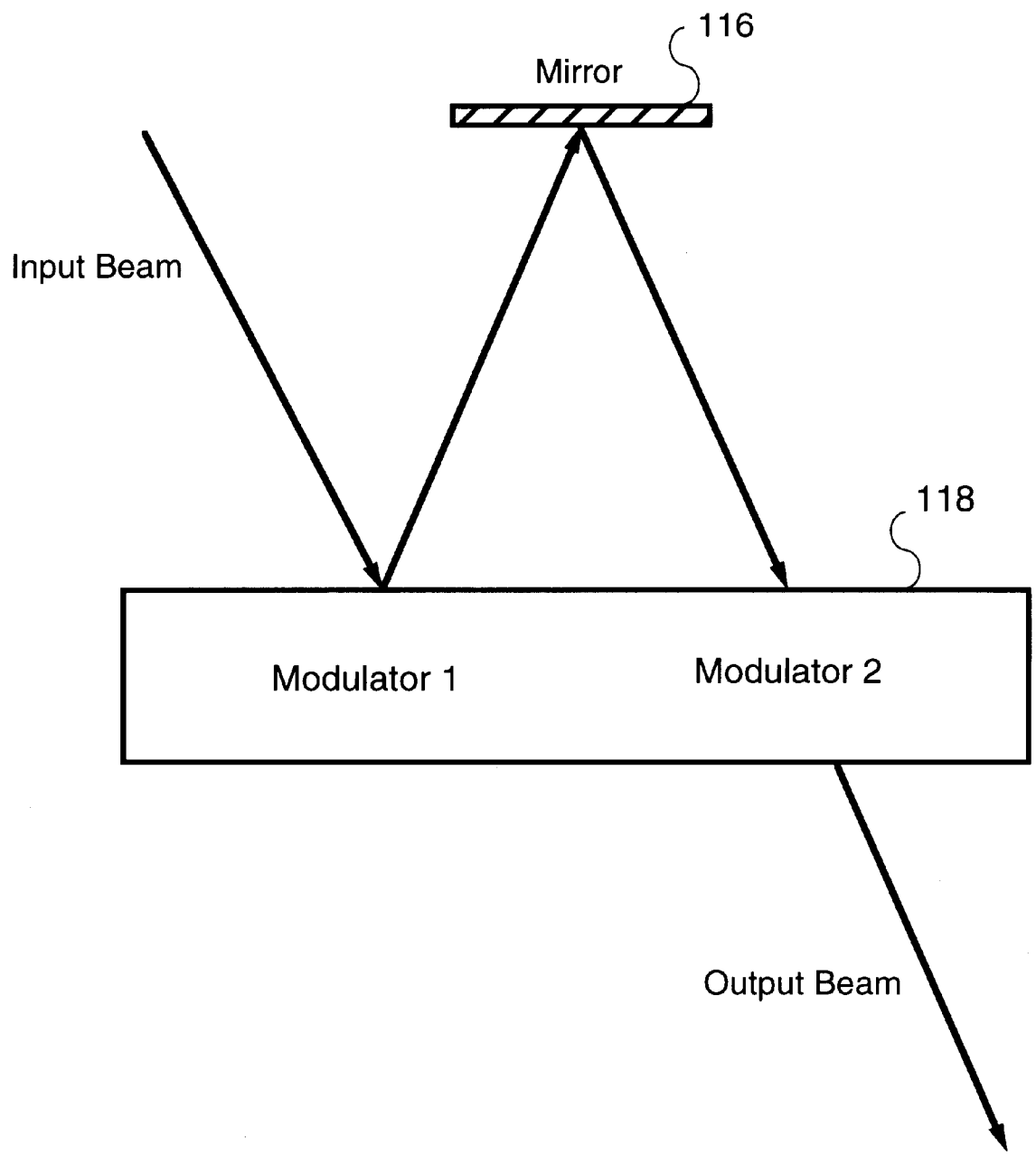
FIG. 8 is a schematic diagram of a multi-bounce architecture to achieve complex switching with a single wafer.

Aside from the 3-D array arrangement described earlier, other device layouts can also be used to perform complex routing or logic functions, such as a multi-bounce architecture as shown in FIG. 8. In the configuration, a single plane of devices 118 is incorporated with mirrors 116 to allow the output from some devices to become the input for subsequent devices. The arrangement of mirrors and the angle at which the light enters the specific devices determine which devices are optically connected with one another.

Figure 9:
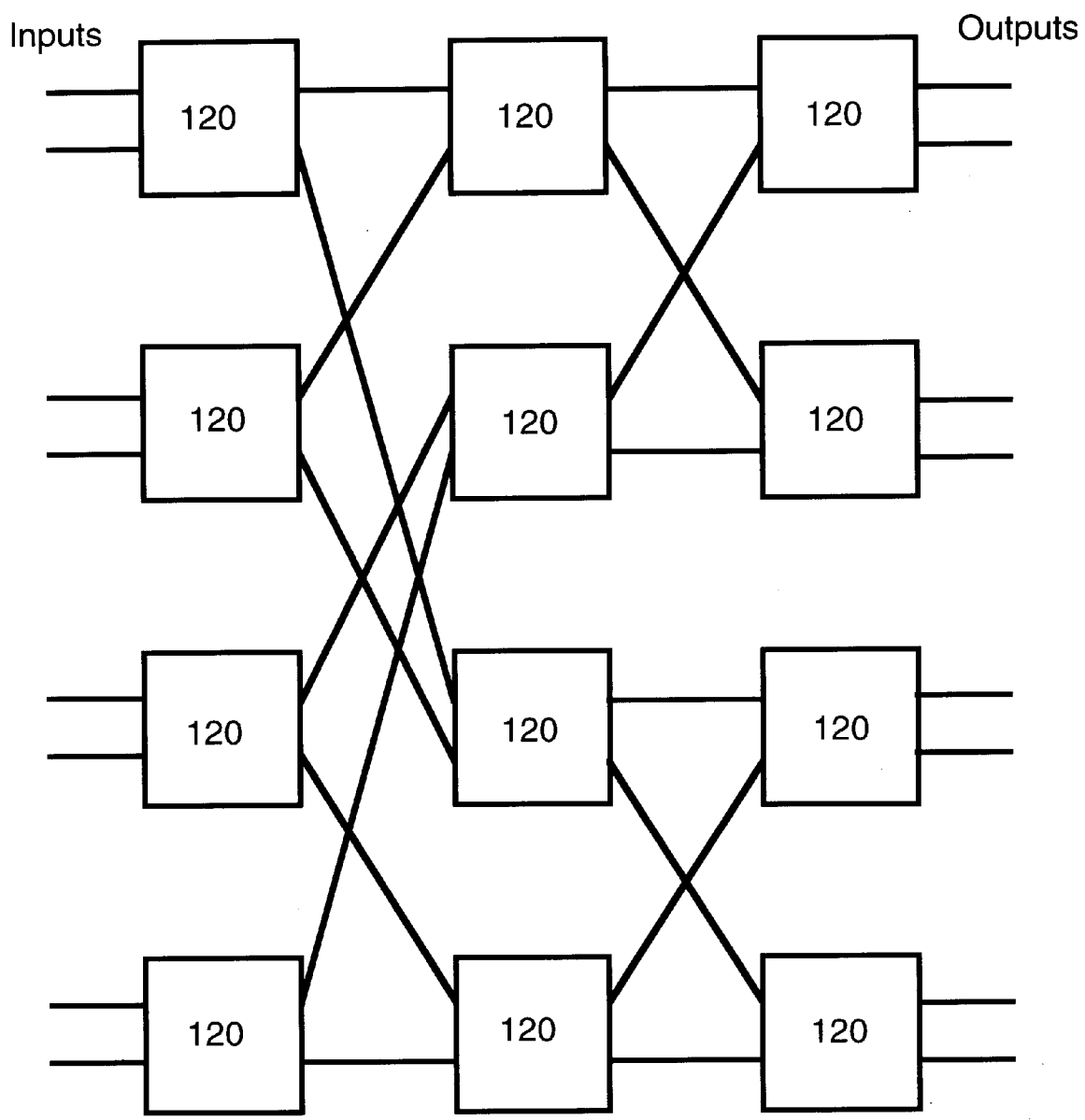
FIG. 9 is a schematic diagram of a general interconnect scheme using a combination of an X-modulator and a mirror in each cell.

With any one of the 3-D array configurations, the multi-bounce configurations, or other architecture, several X-modulators with external mirrors can be used to allow for the proper connectivity between the outputs of one device stage and the inputs of the subsequent stage. FIG. 9 shows an example of a general interconnect network with 8 inputs and 8 outputs. The system comprises twelve units 120 of one X-modulator and external mirrors. In general, a system with n inputs and n outputs requires $\log_2(n)$ stages (planes) of devices 120.

Figure 10:
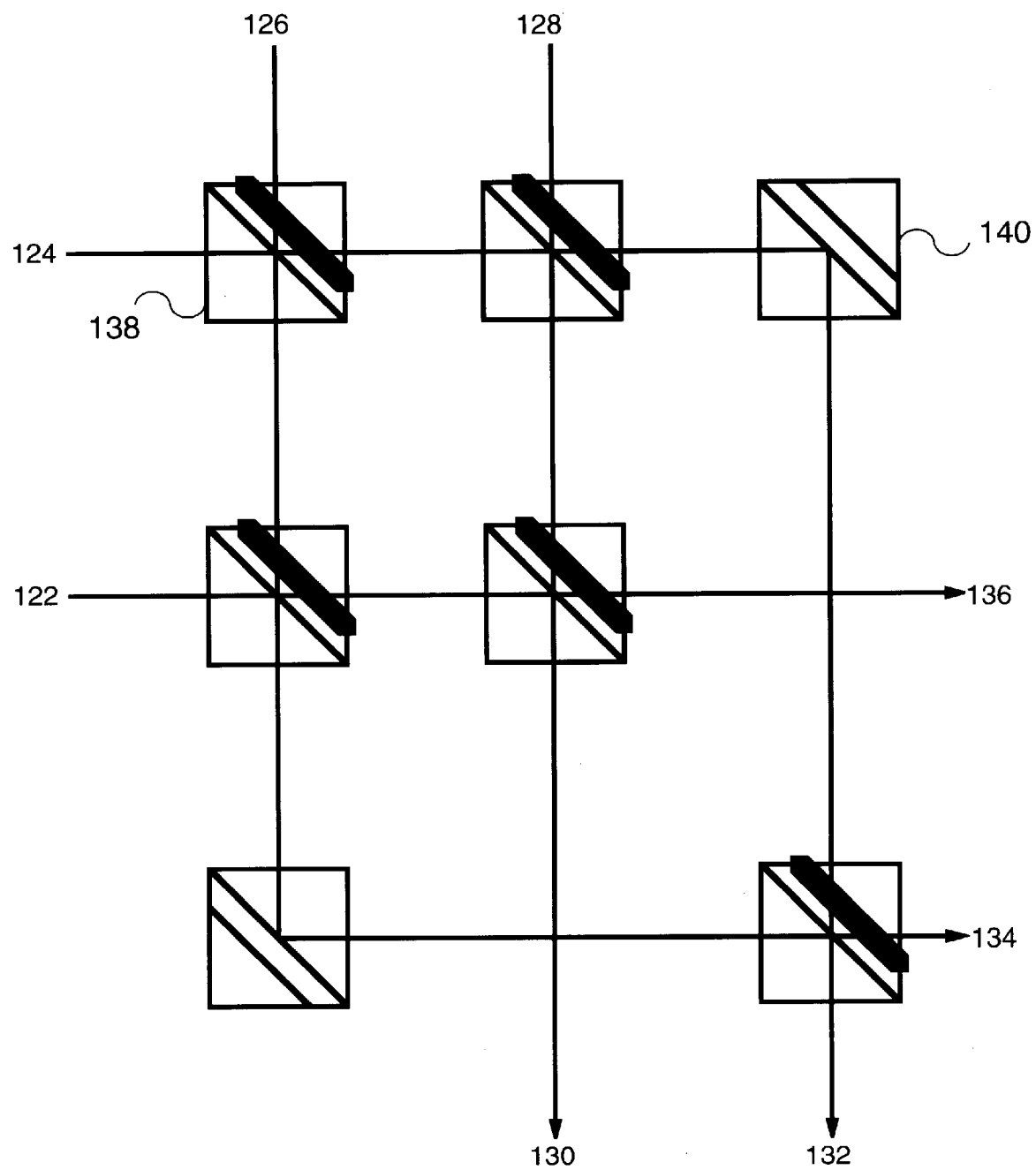
FIG. 10 is a schematic diagram of a 4×4 crossbar switch realizable with five X-modulators.
Figure 11:
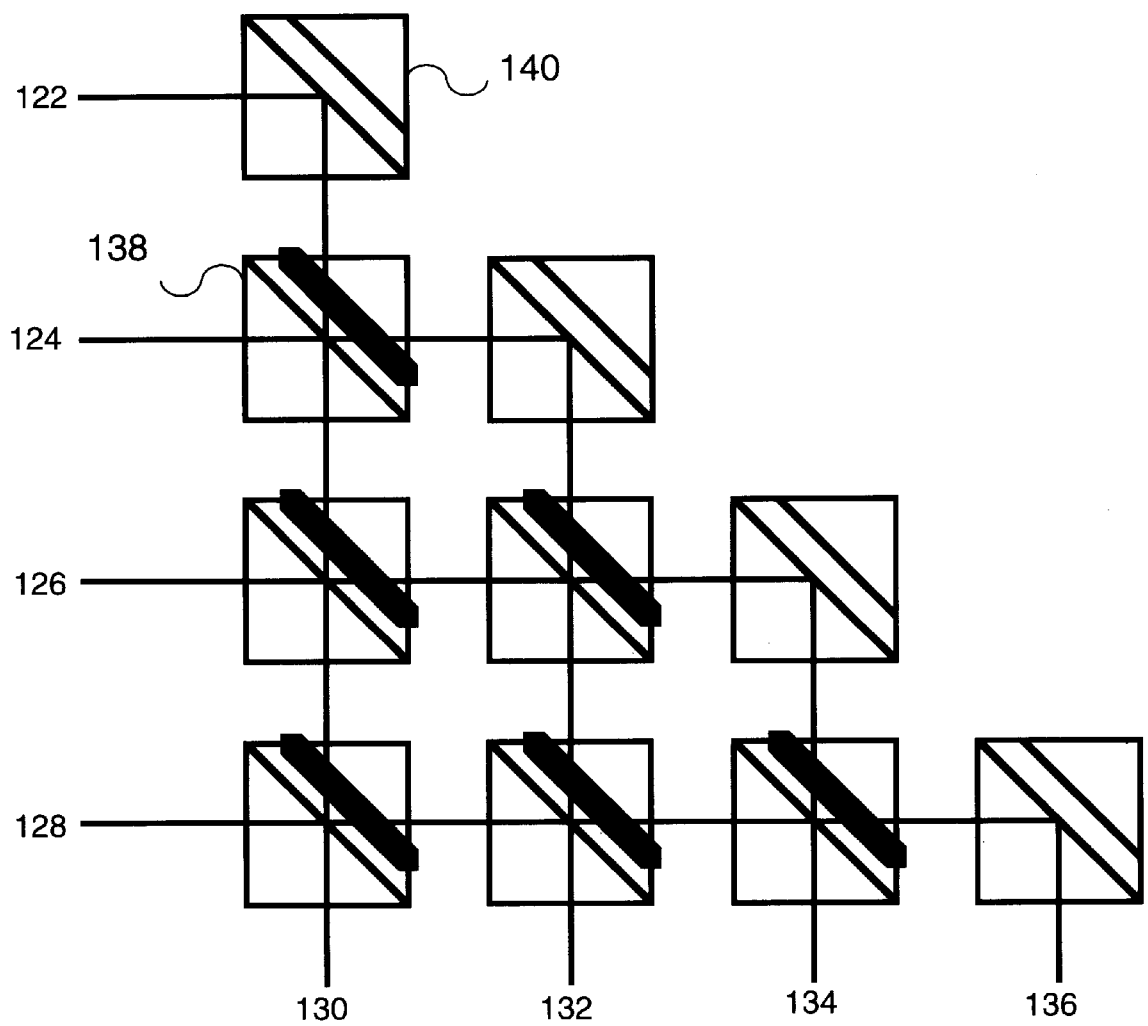
FIG. 11 is a schematic diagram of a 4×4 crossbar switch realizable with six X-modulators.
Figure 12:
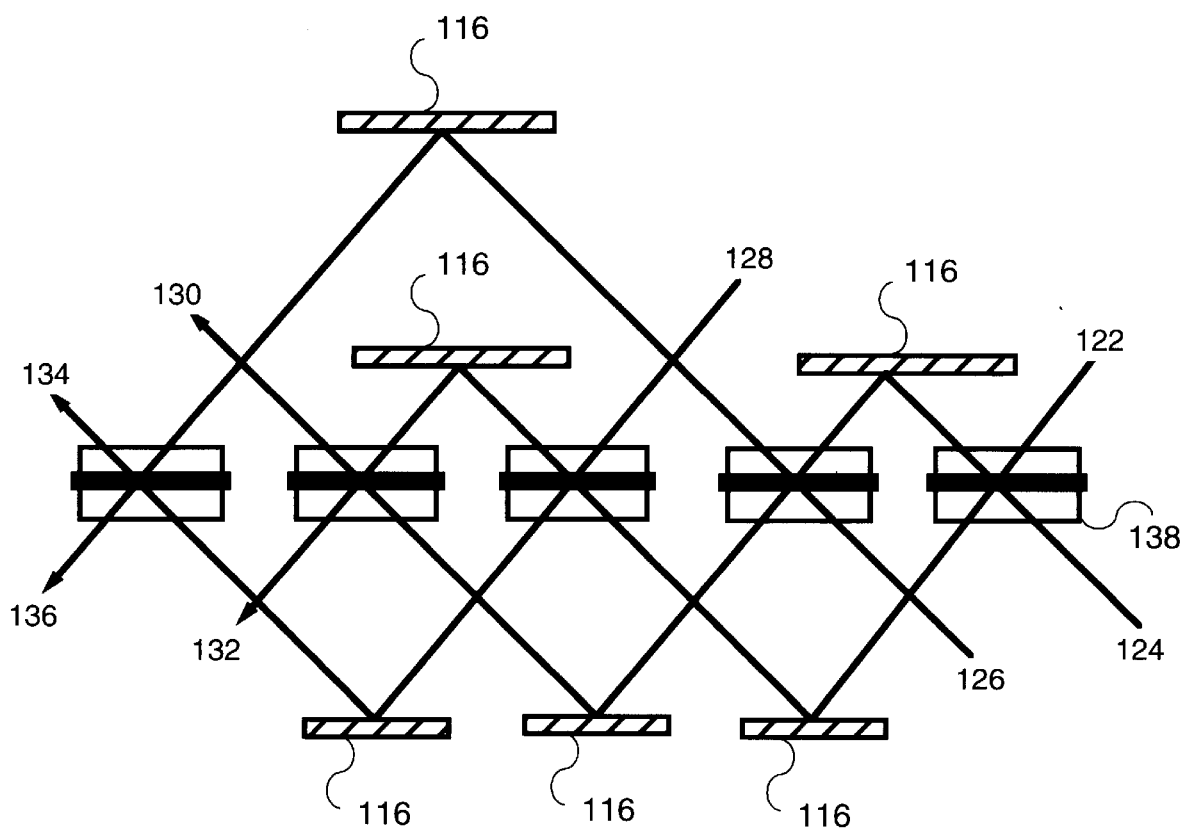
FIG. 12 is a schematic diagram of a 4×4 crossbar switch realizable with five X-modulators in a multi-bounce architecture.

While a single X-modulator can provide a 2×2 crossbar switch, the combination of a minimum of $\log_2(n)$ devices can form a n×n crossbar switch which can accept n inputs and generate n! permutations. FIG. 10 shows an example of a 4×4 crossbar switch with four inputs 122, 124, 126, and 128, and four outputs 130, 132, 134, and 136. The switch comprises five X-modulators 138 and two sets of fixed mirrors 140. While the minimum number of devices 138 is five, a greater number of elements can be used to simplify the device layout and packaging. FIG. 11 shows how a 4×4 crossbar switch can be realized with six X-modulators 138 to obtain a different arrangement of inputs and outputs. FIG. 12 depicts how five X-modulators 138 are arranged in the multi-bounce configuration with mirrors 116 to perform the 4×4 crossbar switching. In such a configuration, only a single plane of devices is needed and external mirrors connect the appropriate outputs to the inputs.

Figure 13:
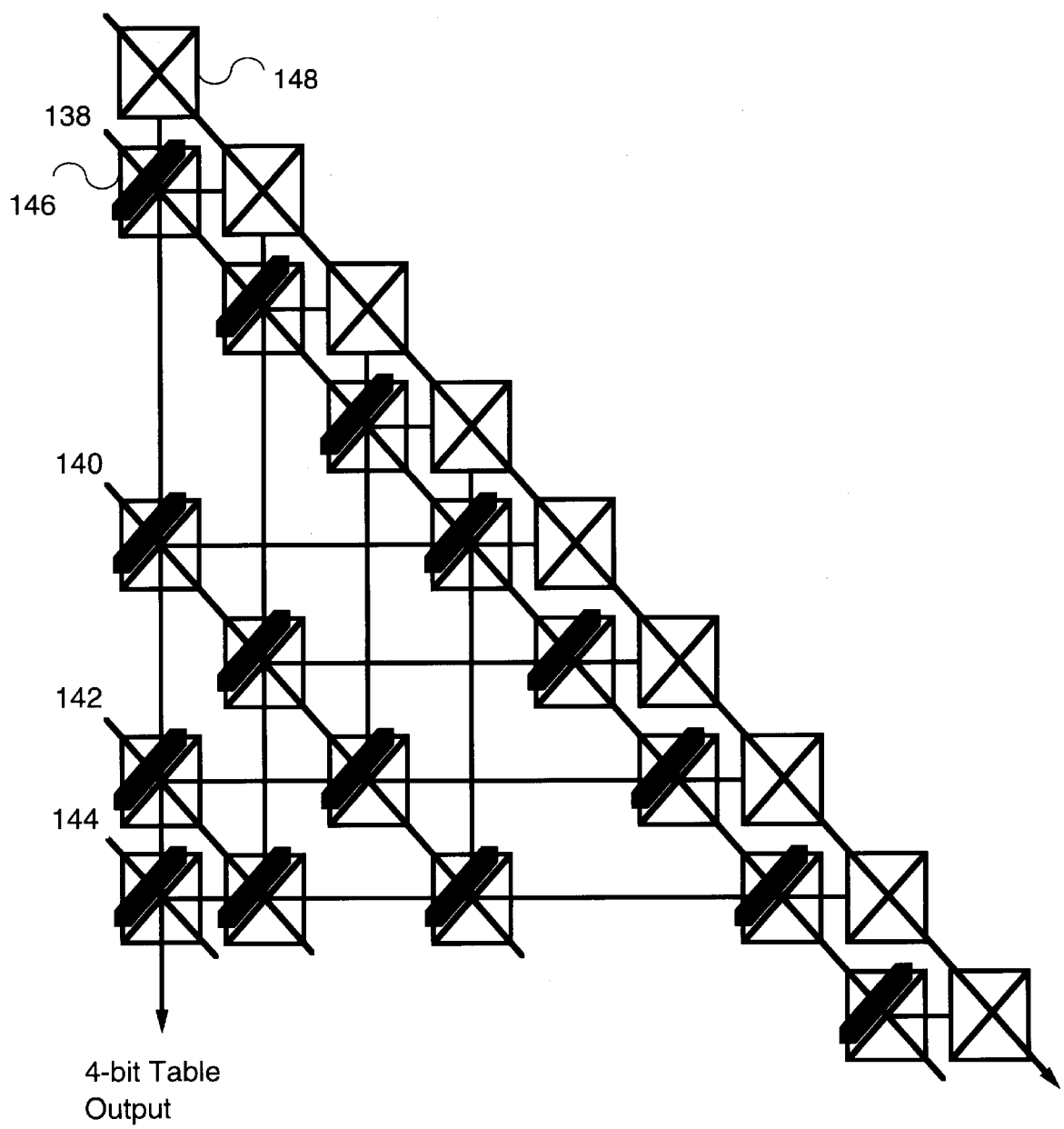
FIG. 13 is a schematic diagram of a FPGA using X-modulators.
Figure 14F:
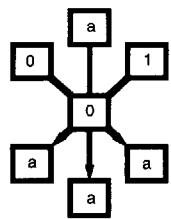
Figure 14F:
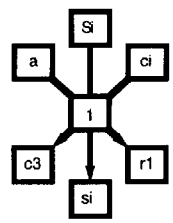
Figure 14F:
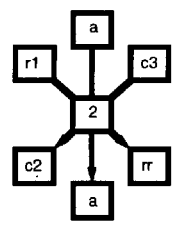
Figure 14F:
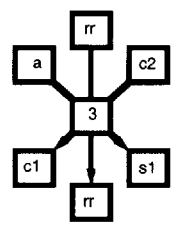
Figure 14F:
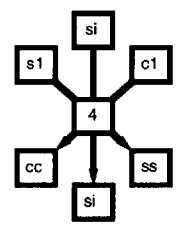
Figure 14F:
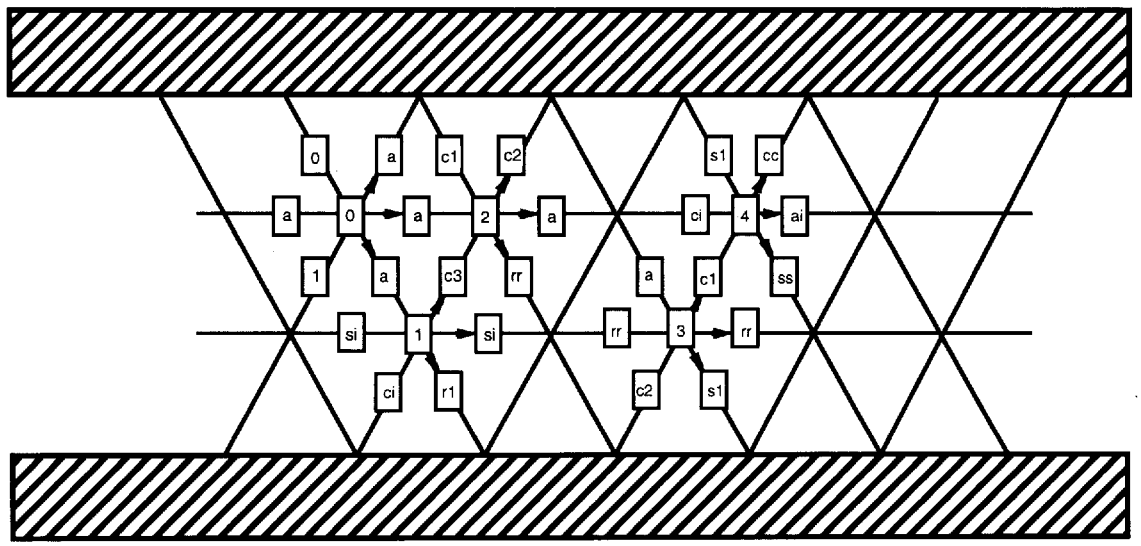

FIG. 13 shows a simple implementation of Field Programmable Gate Array (FPGA) based on a 16-bit lookup table using X-modulators. The gate array comprises multiple 2-way multiplexors 146 and 2-bit scan cells 148. By programming the reflection/transmission properties of each X-modulator with one bias line, a set of four address/bias lines can be used to address the array and obtain a 16-bit output. This can be used to simulate logic functions or as an electro-optical RAM cell. A complicated arrangement of four X-modulators connected by mirrors and external optics can implement a full-adder circuit, as shown in FIGS. 14A through 14F. Such an arrangement is a basic building block for more complicated arithmetic operations and counter circuits. Because the X-modulator is a primitive unit into which all logic functions can be decomposed, more complicated arrangements can provide more complex computing functionality.

Due to the inherent non-uniformity in thickness for molecular beam epitaxy (MBE) and metal organic chemical vapor deposition (MOCVD) wafers, each device of a 1-D or 2-D array can be made to operate at a slightly different wavelength. These wafers contain a radial thickness-non-uniformity between 1% and 2% across a 2-inch diameter in a typical growth, which can be enhanced or suppressed. A multi-wavelength and multi-channel optical input can be focused on an array of X-modulators with a series of elliptical lenses or with prisms. Each X-modulator independently controls the output direction of a single wavelength. After the modulation, the individual wavelengths can be recombined into an optic fiber through external lenses or other means. Thus the wavelength demultiplexing can be performed and switching on individual components realized. Alternatively, each device in the array could be made to modulate the same wavelength. In this case the input fiber provides a single wavelength input, and each device in the array modulates at a different time. Thus time-division multiplexing can be performed, and again the various signals can be recombined at the output.

Additional applications such as Q-switching of lasers can also be implemented. Here an X-modulator is placed at the output of a laser. By switching the X-modulator on and off, the laser output can be switched on and off. An X-modulator can also be placed in a lithographic system. It controls the transmission of the lithographic light.

It will be clear to one skilled in the art that the above embodiment may be altered in many ways without departing from the scope of the invention. Accordingly, the scope of the invention should be determined by the following claims and their legal equivalents.

What is claimed is:

1. A reflective and transmissive device for modulating optical signals, the device comprising:
    a) a first mirror having a reflectivity $R_1$,
    b) a second mirror having a reflectivity $R_2$ and positioned parallel to the first mirror, and
    c) an active region positioned between the first mirror and the second mirror and having a variable optical absorption coefficient, $\alpha$, controlled by a control signal;
    wherein the device has a first state where the device is transmissive so that the optical signals are mostly transmitted through the device,
    wherein the device has a second state where the device is reflective so that the optical signals are mostly reflected from the device, and
    wherein the index of refraction of the active region in the first state is nearly equal to the index of refraction of the active region in the second state.

2. The device of claim 1 wherein the first mirror, second mirror, and active region form a slightly asymmetric Fabry-Perot cavity.

3. The device of claim 1 wherein the control signal is an electrical control signal.

4. The device of claim 1 wherein the control signal is an optical control signal.

5. The device of claim 1 wherein $R_1$ is nearly equal to $R_2 e^{-\alpha L}$ where $\alpha$ is an optical absorption coefficient of the active region in one of the two states of the device, and where L is a distance between the first mirror and the second mirror.

6. The device of claim 1 wherein the device has nearly identical characteristics of reflection versus bias for signals incident on the first or second mirror, respectively.

7. The device of claim 1 wherein the device has nearly identical characteristics of transmission versus bias for signals incident on the first or second mirror, respectively.

8. The device of claim 1 wherein the intensity of the optical signals transmitted through the device in the first state is substantially equal to the intensity of the optical signals reflected from the device in the second state.

9. The device of claim 1 wherein the device further comprises a gain region capable of amplifying the optical signals incident the device.

10. The device of claim 1 wherein the active region contains a material with a large third order nonlinear coefficient when the optical control signal is used.

11. The device of claim 1 wherein the device is implemented as a vertical cavity device, the first and second mirrors are quarterwave stacks and the active region comprises quantum wells.

12. The device of claim 11 wherein the vertical cavity device is grown on a substrate material chosen from the group consisting of a semiconductor crystal, a glass, and sapphire.

13. The device of claim 12 wherein the semiconductor crystal is chosen from the group consisting of GaAs, SiN, SiC, GaN, and InP of which GaAs, GaN, and InP can also contain one or both of Al and In.

14. The device of claim 1 wherein the device is implemented as a waveguide device, the first and second mirrors are DBR mirrors and the active region comprises quantum wells.

15. The device of claim 1 wherein the first mirror and second mirror are doped p-type and n-type semiconductors, respectively.

16. The device of claim 1 wherein the first mirror and second mirror are made of GaAs/AlAs.

17. The device of claim 1 wherein at least one of the first and second mirrors comprises a dielectric material.

18. The device of claim 17 wherein the dielectric material comprises a material chosen from the group consisting of $SiO_2$, $ZrO_2$, $TiO_2$, and $YO_3$.

19. The device of claim 1 wherein at least one of the first and second mirrors comprises a metal.

20. The device of claim 1 wherein the active region comprises a material chosen from the group consisting of a plasma, an organic polymer, a lithium niobate crystal, a semiconductor material, photo-refractive crystals, a liquid crystal material, and electro-optic crystals.

21. The device of claim 20 wherein the semiconductor material comprises InGaAs/GaAs.

22. A bi-directional and reversible device for modulating optical signals, the device comprising:
   a) a first mirror having a reflectivity $R_1$,
   b) a second mirror having a reflectivity $R_2$ and positioned parallel to the first mirror, and
   c) an active region positioned between the first mirror and the second mirror, the active region having a variable optical absorption coefficient controlled by a control signal to switch the device between a first state and a second state;
   wherein the device is transmissive in the first state and reflective in the second state;
   wherein the device affects the optical signals incident on the first mirror in substantially the same way as it affects the optical signals incident on the second mirror, in both the first state and in the second state, and
   wherein the index of refraction of the active region in the first state is nearly equal to the index of refraction of the active region in the second state.

23. The device of claim 22 wherein the first mirror, second mirror, and active region form a slightly asymmetric Fabry-Perot cavity.

24. The device of claim 22 wherein the control signal is an optical control signal.

25. The device of claim 22 wherein the control signal is an electrical control signal.

26. The device of claim 22 wherein the device further comprises a gain region capable of amplifying the optical signals incident the device.

27. The device of claim 22 wherein the active region contains a material with a large third order nonlinear coefficient when the optical control signal is used.

28. The device of claim 22 wherein the device is implemented as a vertical cavity device, the first and second mirrors are quarterwave stacks and the active region comprises quantum wells.

29. The device of claim 28 wherein the vertical cavity device is grown on a substrate material chosen from the group consisting of a semiconductor crystal, a glass, and sapphire.

30. The device of claim 29 wherein the semiconductor crystal is chosen from the group consisting of GaAs, SiN, SiC, GaN, and InP of which GaAs, GaN, and InP can also contain Al and In.

31. The device of claim 22 wherein the device is implemented as a waveguide device, the first and second mirrors are DBR mirrors and the active region comprises quantum wells.

32. The device of claim 22 wherein the first mirror and second mirror are doped p-type and n-type semiconductors, respectively.

33. The device of claim 22 wherein the first mirror and second mirror are made of GaAs/AlAs.

34. The device of claim 22 wherein at least one of the first and second mirrors comprises a dielectric material.

35. The device of claim 34 wherein the dielectric material comprises a material chosen from the group consisting of $SiO_2$, $ZrO_2$, $TiO_2$, and $YO_3$.

36. The device of claim 22 wherein at least one of the first and second mirrors comprises a metal.

37. The device of claim 22 wherein the active region comprises a material chosen from the group consisting of a plasma, an organic polymer, a lithium niobate crystal, a photo-refractive crystal, a electro-optic crystal, a liquid crystal material, and a semiconductor material.

38. The device of claim 37 wherein the semiconductor material comprises InGaAs/GaAs.

39. An optical modulator array comprising a plurality of devices for modulating optical signals, at least one device in the plurality comprising:
   a) a first mirror having a reflectivity $R_1$,
   b) a second mirror having a reflectivity $R_2$ and positioned parallel to the first mirror, and
   c) an active region positioned between the first mirror and the second mirror, the active region having a variable optical absorption coefficient,
   wherein the device is switched between a first state and a second state by a control signal which changes the optical absorption coefficient of the active region between a first value $\alpha_1$ and a second value $\alpha_2$; and
   wherein the device is transmissive in the first state and reflective in the second state so that the device in the first state affects optical signals by mostly transmitting them through the device and the device in the second state affects optical signals by mostly reflecting them from the device.

40. The array of claim 39 wherein the first mirror, second mirror, and active region form a slightly asymmetric Fabry-Perot cavity.

41. The array of claim 39 wherein the device is bi-directional and reversible so that, in each of the two states, the device affects optical signals incident on the first mirror in substantially the same way as is affects optical signals incident on the second mirror.

42. The array of claim 39 wherein the devices are arranged in a plane.

43. The array of claim 39 wherein the devices are stacked in a three-dimensional array.

44. An optical modulator array comprising a plurality of devices for modulating optical signals, at least one device in the plurality comprising:
   a) a first mirror having a reflectivity $R_1$,
   b) a second mirror having a reflectivity $R_2$ and positioned parallel to the first mirror, and
   c) an active region positioned between the first mirror and the second mirror, the active region having a variable optical absorption coefficient,
   wherein the device is switched between a first state and a second state by a control signal which changes the optical absorption coefficient of the active region between a first value $\alpha_1$ and a second value $\alpha_2$ while leaving the index of refraction of the active region substantially unchanged; and
   wherein the device is transmissive in the first state and reflective in the second state so that the device in the first state affects optical signals by mostly transmitting them through the device and the device in the second state affects optical signals by mostly reflecting them from the device.

* * * * *

UNITED STATES PATENT AND TRADEMARK OFFICE
CERTIFICATE OF CORRECTION

PATENT NO. : 5,909,303
DATED : June 1, 1999
INVENTOR(S) : John A. Trezza et al.

It is certified that error appears in the above-indentified patent and that said Letters Patent is hereby corrected as shown below:

Column 1, Line 7   INSERT -- STATEMENT REGARDING FEDERALLY SPONSORED RESEARCH OR DEVELOPMENT

This invention was made with government support under contract number N00014-93-I-0043 awarded by the Department of the Navy ONR. The Government has certain rights in the invention.

Signed and Sealed this

Twenty-third Day of November, 1999

*Attest:*

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO. : 5,909,303
APPLICATION NO. : 08/778817
DATED : June 1, 1999
INVENTOR(S) : Harris et al.

Page 1 of 1

It is certified that error appears in the above-identified patent and that said Letters Patent is hereby corrected as shown below:

In the Specification, Col. 1, line 13, please insert:

-- FEDERALLY-SPONSORED RESEARCH OR DEVELOPMENT

This invention was made with Government support under contract N00014-93-1-0043 awarded by the Department of the Navy ONR. The Government has certain rights in this invention. --

Signed and Sealed this
Twenty-third Day of August, 2011

David J. Kappos
*Director of the United States Patent and Trademark Office*